June 9, 1942.  F. F. LAWRENZ  2,285,522
PLANT SUPPORT
Filed May 16, 1940
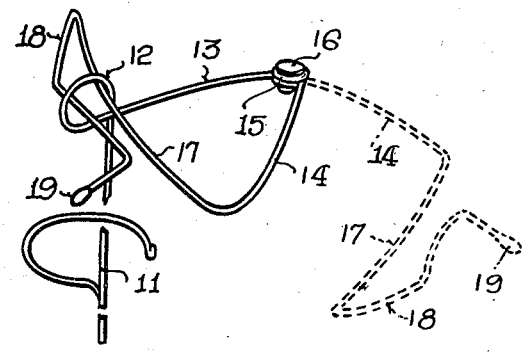
Fred F. Lawrenz
INVENTOR.
BY
ATTORNEY.

Patented June 9, 1942

2,285,522

UNITED STATES PATENT OFFICE 2,285,522

PLANT SUPPORT

Fred F. Lawrenz, Dallas, Tex.

Application May 16, 1940, Serial No. 335,442

1 Claim. (Cl. 47—47)

This invention relates to a support for tender growing plants and for flowers whose blossoms and top foliage overburdens the stems and the chief object of the invention is to afford a support comprised of uprights to be suitably anchored in the earth, with members to be horizontally supported thereby for embracing and supporting the plant.

Another object of the invention is to provide a support for potted, hot-house or garden plants and even vegetable plants in the growing stage or at maturity, in which the horizontally disposed elements actually holding the plant may be vertically moved as the plant grows in height or to accommodate tall flowering plants such as chrysanthemums and the like. The chief advantage derived from the peculiar construction of the invention lies in the fact that all of the parts are preformed and for this reason, the support may be placed about a plant without bruising the tender stems, which often results when setting up some of the conventional wire supports, requiring manual shaping to conform to plant height and foliage.

Another object of the invention resides in means carried by the uprights for stabilizing the same and holding them firmly in the earth.

With the foregoing objects as paramount, the invention has particular reference to certain salient features of construction and arrangement of parts, to become manifest as the description proceeds, taken in connection with the accompanying drawing, wherein:

The figure is a perspective view of a plant support embodying the invention.

Continuing with a more detailed description of the drawing, the wire 11, which constitutes the leg or support is bent to form a loop 12, at its top, the end portion 13 extending outward at right angles to the wire leg 11. A separate piece of wire 14 is provided with a loop 15 corresponding to a similar loop in the end of portion 13. A pin 16 joins portions 13 and 14 together for pivotal movement as shown. The portion 17 is bent into a loop 18, which latter is insertable through loop 12 to retain the pivoted portion in position about a plant stalk. It is simply necessary to press the end 19 against portion 17 to withdraw the loop 18 from loop 12. It is therefore apparent that the two wires 13 and 14, which may be referred to as loop portions, when joined together, provide a continuous loop at the top of the support to embrace a plant stalk.

It is apparent from the foregoing that the invention avoids the necessity of providing unsightly makeshift supports likely to damage the plants and is of such inexpensive construction that the devices embodying the same may be employed in quantities by flower fanciers as well as plant culturists and florists.

Manifestly, the construction as shown and described is capable of some modification and such modification as may be construed to fall within the scope and meaning of the appended claim is also considered to be within the spirit and intent of the invention.

What is claimed is:

A plant holding device comprising a soil piercing upright support formed of wire and bent abruptly at right angles at its upper end and curved to define a portion of a loop lying on a horizontal plane, a second wire shaped to define the remainder of said loop and having one end held against other than pivotal movement to the free end of said first loop portion, to be supported solely by the support of said first looped portion and whereby the loop formed thereby will embrace a plank stalk and means carried jointly by said upright support and said pivoted wire to secure the free end of the latter to said support.

FRED F. LAWRENZ.